Sept. 8, 1959  R. F. WELLS ET AL  2,903,572
ROUTE CHECK SCHEME FOR RAILWAY CODE
COMMUNICATION SIGNALING SYSTEM
Filed Dec. 28, 1954  8 Sheets-Sheet 1

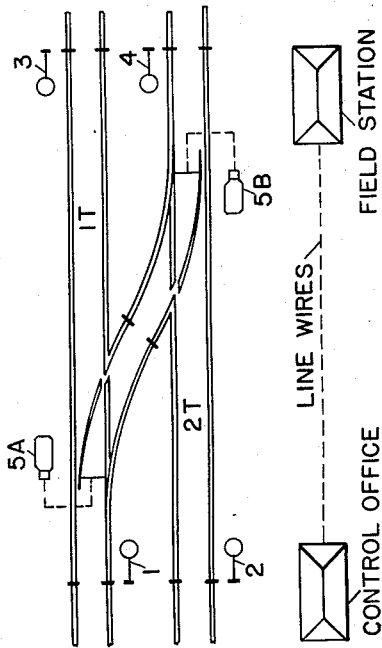

FIG.1A.

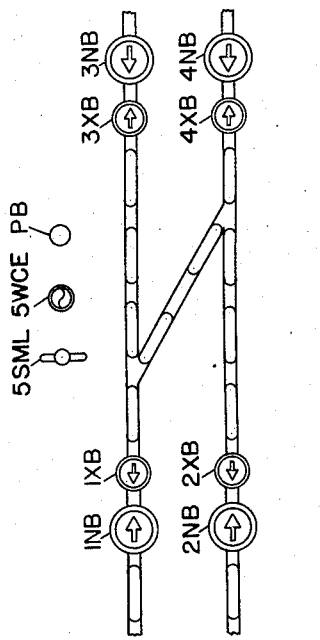

CODE CHART

| STEP | | 1 | 2 | 3 | 4 | 5 | 6 | 7 | 8 | 9 | 10 |
|---|---|---|---|---|---|---|---|---|---|---|---|
| CONTROL CYCLE (DUPLEX) | CONTROLS | SWITCH 5 NORMAL-PC REVERSE-NC | SPARE | SPARE | SPARE | SPARE | SPARE | SIGNAL 1 CLEAR-PC STOP-NC | SIGNAL 2 CLEAR-PC STOP-NC | SIGNAL 3 CLEAR-PC STOP-NC | SIGNAL 4 CLEAR-PC STOP-NC |
| | INDICATIONS | LOCK 1 LOCKED-M UNLOCKED-S | LOCK 2 LOCKED-M UNLOCKED-S | SW.5 5NZK-M | SW.5 5RZK-M | TRACK 1 OCCUPIED-M UNOCCUPIED-S | TRACK 2 OCCUPIED-M UNOCCUPIED-S | SIGNAL 1 CLEAR-M STOP-S | SIGNAL 2 CLEAR-M STOP-S | SIGNAL 3 CLEAR-M STOP-S | SIGNAL 4 CLEAR-M STOP-S |
| INDICATION CYCLE (SIMPLEX) | INDICATIONS | LOCK 1 LOCKED-M UNLOCKED-S | LOCK 2 LOCKED-M UNLOCKED-S | SW.5 5NK-M | SW.5 5RK-M | TRACK 1 OCCUPIED-M UNOCCUPIED-S | TRACK 2 OCCUPIED-M UNOCCUPIED-S | SIGNAL 1 CLEAR-M STOP-S | SIGNAL 2 CLEAR-M STOP-S | SIGNAL 3 CLEAR-M STOP-S | SIGNAL 4 CLEAR-M STOP-S |

PC } CONTROL CODE
NC } CHARACTERS
M } INDICATION CODE
S } CHARACTERS

INVENTORS
R.F.WELLS AND
C.A.PICKELL
BY
Forest B. Hitchcock
THEIR ATTORNEY

Sept. 8, 1959 — R. F. WELLS ET AL — 2,903,572
ROUTE CHECK SCHEME FOR RAILWAY CODE COMMUNICATION SIGNALING SYSTEM
Filed Dec. 28, 1954 — 8 Sheets-Sheet 4

INVENTORS
R. F. WELLS AND
C. A. PICKELL
BY
Forest B. Hitchcock
THEIR ATTORNEY

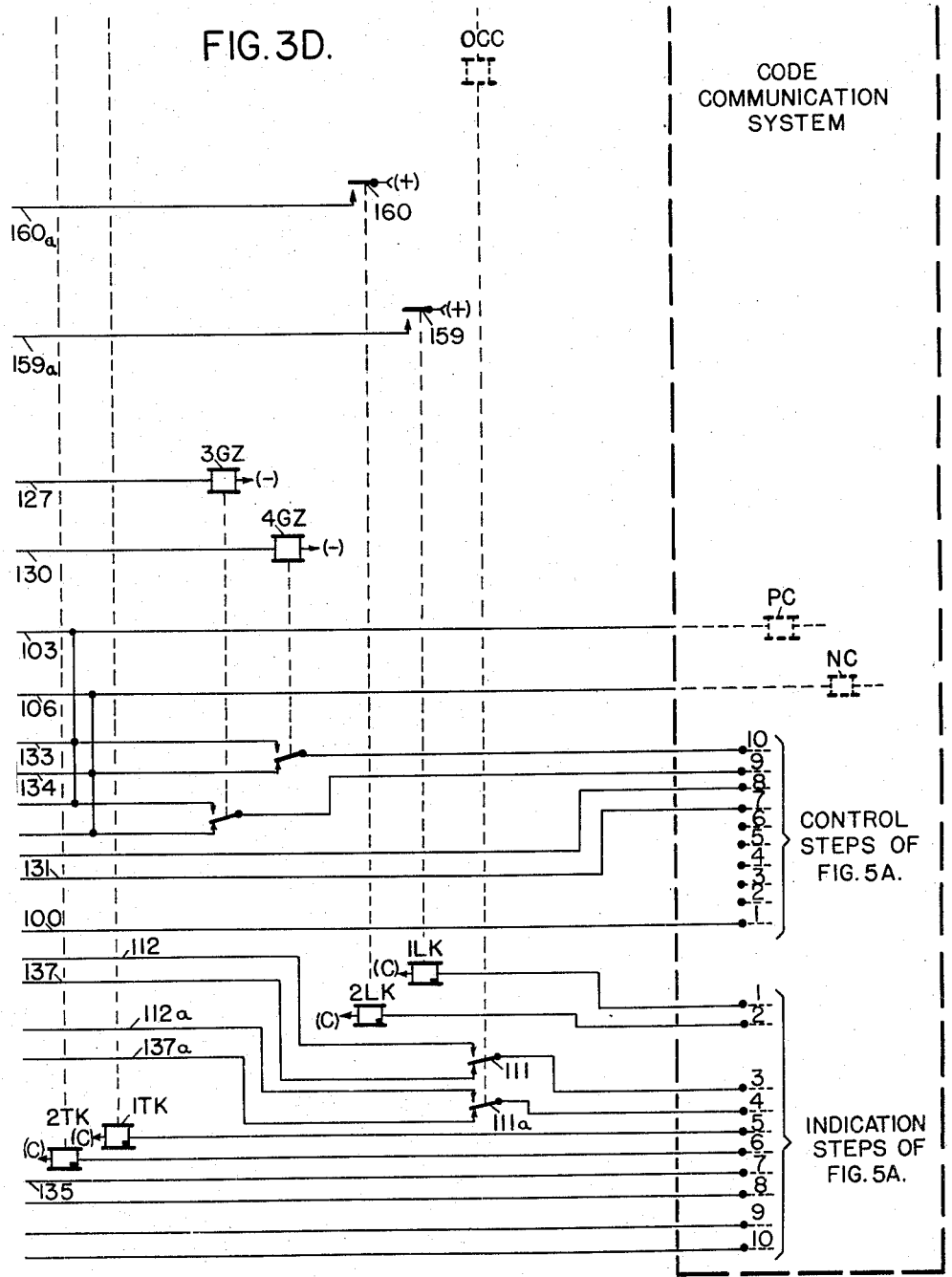

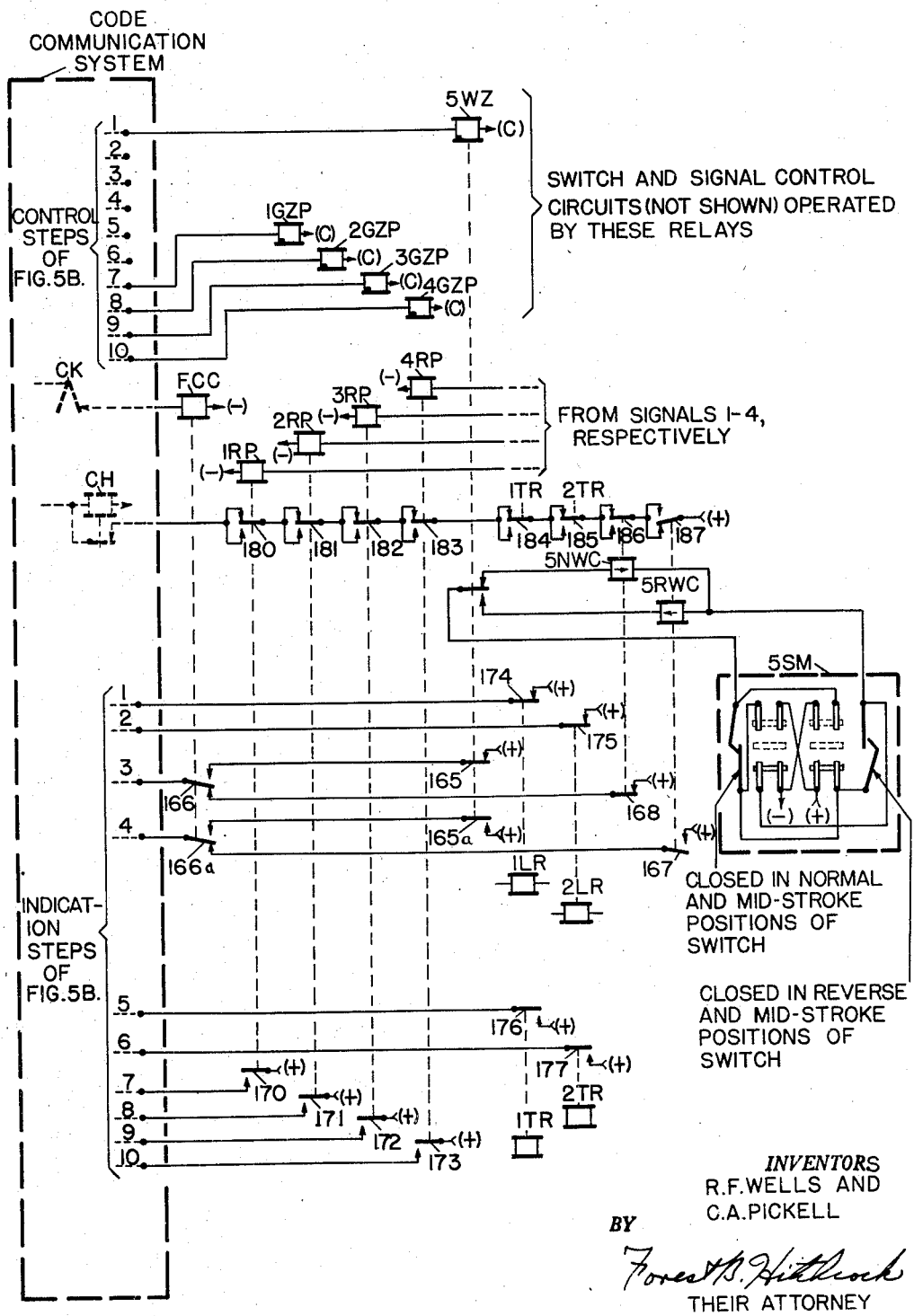

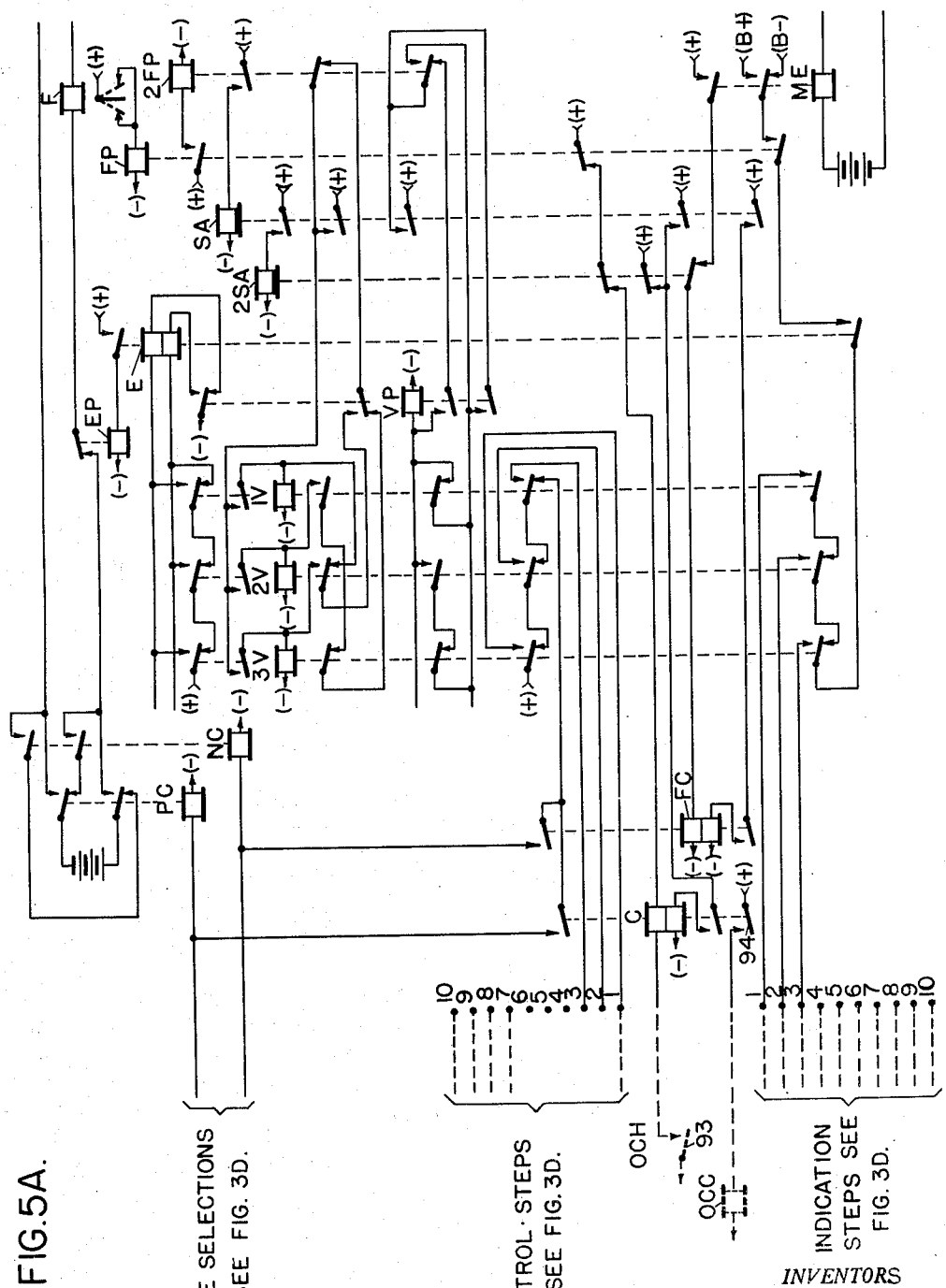

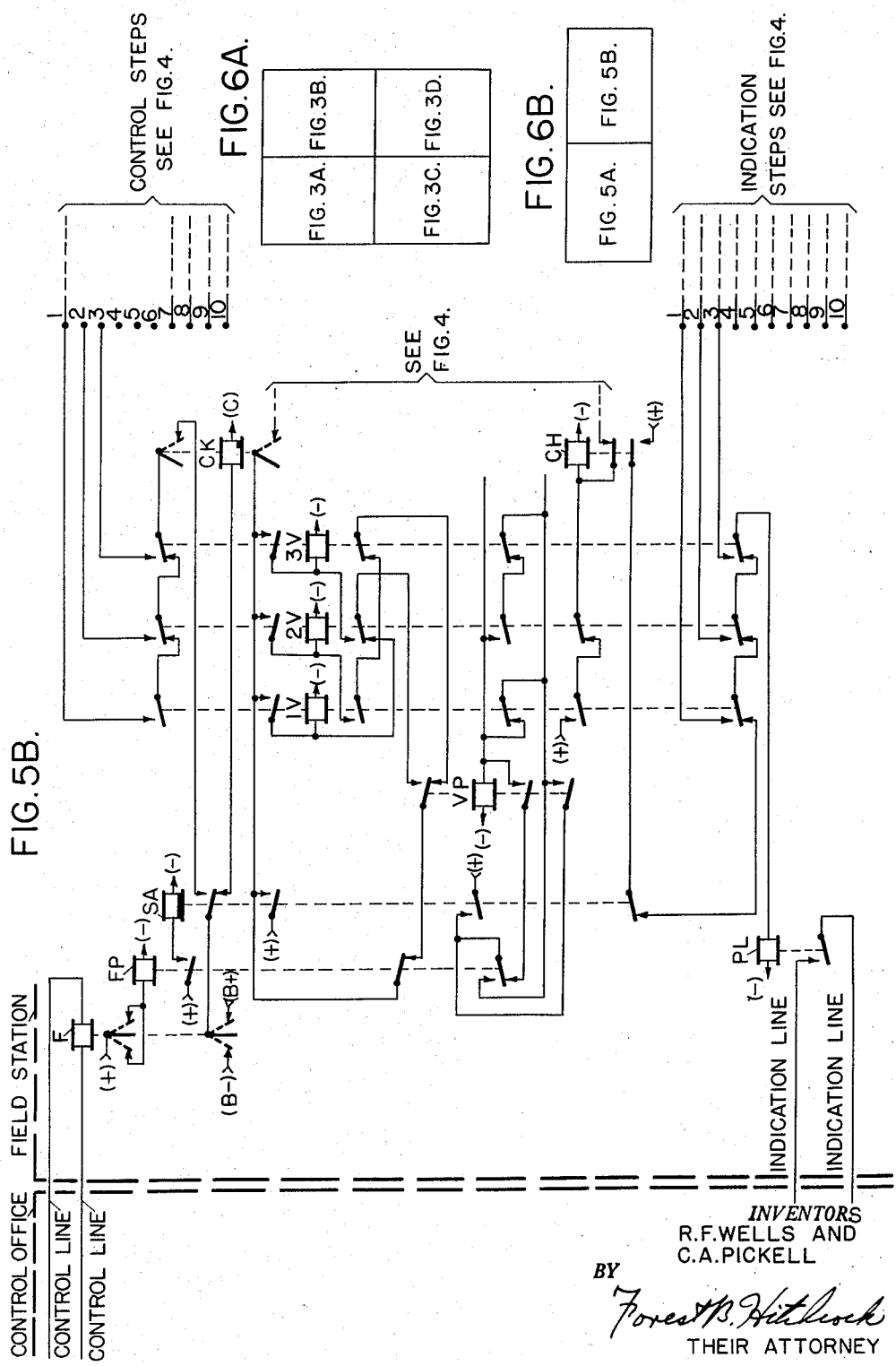

2,903,572

Patented Sept. 8, 1959

2,903,572

ROUTE CHECK SCHEME FOR RAILWAY CODE COMMUNICATION SIGNALING SYSTEM

Robert F. Wells and Clark A. Pickell, Rochester, N.Y., assignors to General Railway Signal Company, Rochester, N.Y.

Application December 28, 1954, Serial No. 477,978

3 Claims. (Cl. 246—3)

This invention relates to railway signaling systems and it more particularly pertains to railway signaling systems which include code communication means.

When large, complex railway interlocking locations are placed under the jurisdiction of a single control office, the speed and efficiency with which a control operator can route traffic through an interlocking location are dependent upon the speed and facility of operation of the signaling system employed. In instances where a control office is located at a considerable distance from an interlocking location a code communication system is usually employed to transmit codes for controlling signaling devices and codes for indicating route and traffic conditions.

Since route control selection means of the so-called entrance-exit type, for example, permit an operator to initiate route controls quickly and efficiently, and since many types of high-speed code communication systems can be employed, the overall speed of operation of a signaling system is dependent upon the manner in which the elements of a particular signaling system are arranged to cooperate.

More specifically, in general practice control codes for selected routes are transmitted by a code communication system in a manner such that control codes for positioning track switches are transmitted initially. Control codes for causing signals to display proceed aspects cannot be transmitted until indication codes are received to indicate that relevant track switches have been operated to positions corresponding to positions called for by related track switch control codes. Thus, the code communication system is compelled to perform a plurality of operating cycles before a particular route is aligned and the signal governing traffic entering the route is cleared. Cycle transmission times and operating times of track switch operating devices must therefore be included in the overall operating time requirements of the signaling system.

Since railway signaling circuits are arranged to prevent the clearing of signals under unsafe operating conditions, the reanson for preventing the transmission of signal clearing codes until correspondence between actual and called-for track switch positions is checked is to prevent the possibility of clearing a signal for an incorrect route. In other words, the reception of a signal clearing code by signal control apparatus might be effective in clearing the signal for an incorrect route if one or more relevant track switches have not had time, or have been unable, to respond to previously transmitted control codes.

In view of the above considerations the present invention provides means whereby control codes for complete routes, including codes for clearing the signals, can be transmitted during a single cycle of operation by a code communication system, protection against the clearing of signals for incorrect routes being provided.

More specifically, the present invention proposes the use of a code communication system capable of transmitting control codes and indication codes concurrently. In other words, the code communication system is of the synchronous duplex type in which control code cycles and indication code cycles may occur simultaneously, the starting of a control code cycle of operation causing the starting of an indication code cycle; but indication code cycles may be started in the absence of control code transmissions.

The characters of indication codes associated with each track switch are determined in the present invention in either of two ways. During the simultaneous transmission of control and indication codes track switch position indication code characters are selected by a track switch control relay, or other device, which is responsive to control codes. The operating position assumed by the track switch control relay in response to control codes indicates the position to which the associated track switch will be operated. During the transmission of indication codes only by the code communication system, track switch position indication code characters are determined by correspondence relays, or other devices, which indicate correspondence between actual and called-for track switch positions. A means is provided for differentiating between indication code cycles which are started in response to control code transmissions and indication code cycles which are started independently.

The route control selection means and various indication selection means are arranged in conjunction with the code communication system in a manner such that when control codes and indication codes are being transmitted simultaneously track switch control codes are transmitted during the first portion of a cycle, track switch position indication codes are transmitted during the next portion of the cycle, and signal control codes are transmitted during the last portion of the cycle. In this manner the response of track switch control relays at the field station to track switch control codes transmitted from the control office is indicated to the route control selection means at the control office before signal control codes are transmitted. Thus, correspondence between track switch positions called-for and positions assumed by track switch control relays may be checked by the route control selection means at the control office in time to permit or to prevent the subsequent transmission of signal clearing codes during the same cycle of operation of the code communication system.

It is evident that track switch position indication codes cannot be determined by actual track switch positions during a control code cycle because the operating times of track switch throwing devices are long compared to the cyclical operating times of code communication systems generally used in railway signaling systems. The operating positions assumed by track switch control devices in response to control codes are acceptable as being indicative of track switch positions insofar as affording protection against clearing signals for incorrect routes is concerned.

An object of this invention is to provide a route check means for use in a railway signaling system which includes code communication means, the route check means being capable of detecting the responses of track switch control devices to control codes, thereby permitting the transmission of track switch and signal clearing control codes for complete routes during a single cycle of operation by the code communication means, protection being provided against the clearing of signals whenever incorrect route conditions exist.

Another object of this invention is to provide a means for differentiating between indication codes which are transmitted by a code communication means in response to the transmission of control codes and indication codes which are transmitted independently in response to changes occurring in route or traffic conditions.

A further object of this invention is to provide a route check means of the type described which can be utilized in conjunction with code communication means which are capable of transmitting control codes and indication codes under either simplex or duplex operating conditions.

Further objects, purposes and characteristic features of the present invention will be in part obvious from the accompanying drawings and in part pointed out as the description of the invention progresses.

In describing the invention in detail, reference is made to the accompanying drawings in which parts having similar features and functions are designated throughout the several illustrations by like letter reference characters, and in which:

Fig. 1A shows schematically a section of a railway interlocking along with a control office and a remote field station;

Fig. 1B represents a control machine panel having a track diagram representing the interlocking shown in Fig. 1A, along with various control and indication apparatus;

Fig. 2 represents a code chart which illustrates the sequence in which the various signaling devices at the interlocking shown in Fig. 1A are controlled by a coded system;

Figs. 3A–3D show diagrammatically control circuits and apparatus in the control office;

Fig. 4 shows diagrammatically circuits and apparatus for the remote field location;

Figs. 5A and 5B show diagrammatically the circuit arrangement for one type of code communication system which can be utilized in conjunction with the present invention;

Fig. 6A is a layout plan showing how circuit drawings 3A–3D must be arranged in relation to each other to present a complete circuit diagram; and Fig. 6B is a layout plan showing how Figs. 5A and 5B must be arranged in relation to each other to present a complete circuit diagram of a code communication system.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of batteries, or other sources of electric current, instead of showing all of the wiring connections to these terminals.

The symbols (+) and (—) are employed to indicate the positive and negative terminals respectively of suitable batteries, or other sources of direct current; and the circuits with which these symbols are used, always have current flowing in the same direction. The symbols (B+) and (B—) indicate connections to the opposite terminals of a suitable battery, or other direct current source which has a central or intermediate tap designated (C); and the circuits with which these symbols are used, may have current flowing in one direction or the other depending upon the particular terminal used in combination with the intermediate tap (C).

In Fig. 1A a section of an interlocking is shown located at a distance from a control office. The interlocking section shown is assumed, for simplicity, to consist of two track sections 1T and 2T, a crossover operated by switch machines 5A and 5B, and signals 1, 2, 3 and 4 for governing traffic entering the interlocking section from various directions. It is further assumed that the track sections 1T and 2T have track circuits and that the various signals are of the searchlight type.

It is assumed that the apparatus for controlling the interlocking is located partly at the interlocking, or field location, and partly at the control office. Coordination between the office and field apparatus is achieved through the use of a code communication system including line wires between the office and field location. The code communication system can be similar, for example, to that disclosed in Judge, Patent No. 2,13,863, dated December 6, 1938; however, any other system which fits the needs of practice can be used.

*Control office apparatus*

It is assumed that the interlocking is controlled from a control machine having a miniature track diagram and various control levers and indication lights arranged for entrance-exit type operation. A control machine of this well-known type is described in greater detail in Judge, Patent No. 2,671,164, dated March 2, 1954. Fig. 1B represents the control machine panel, of the type described, for the interlocking in Fig. 1A.

Figure 3A:
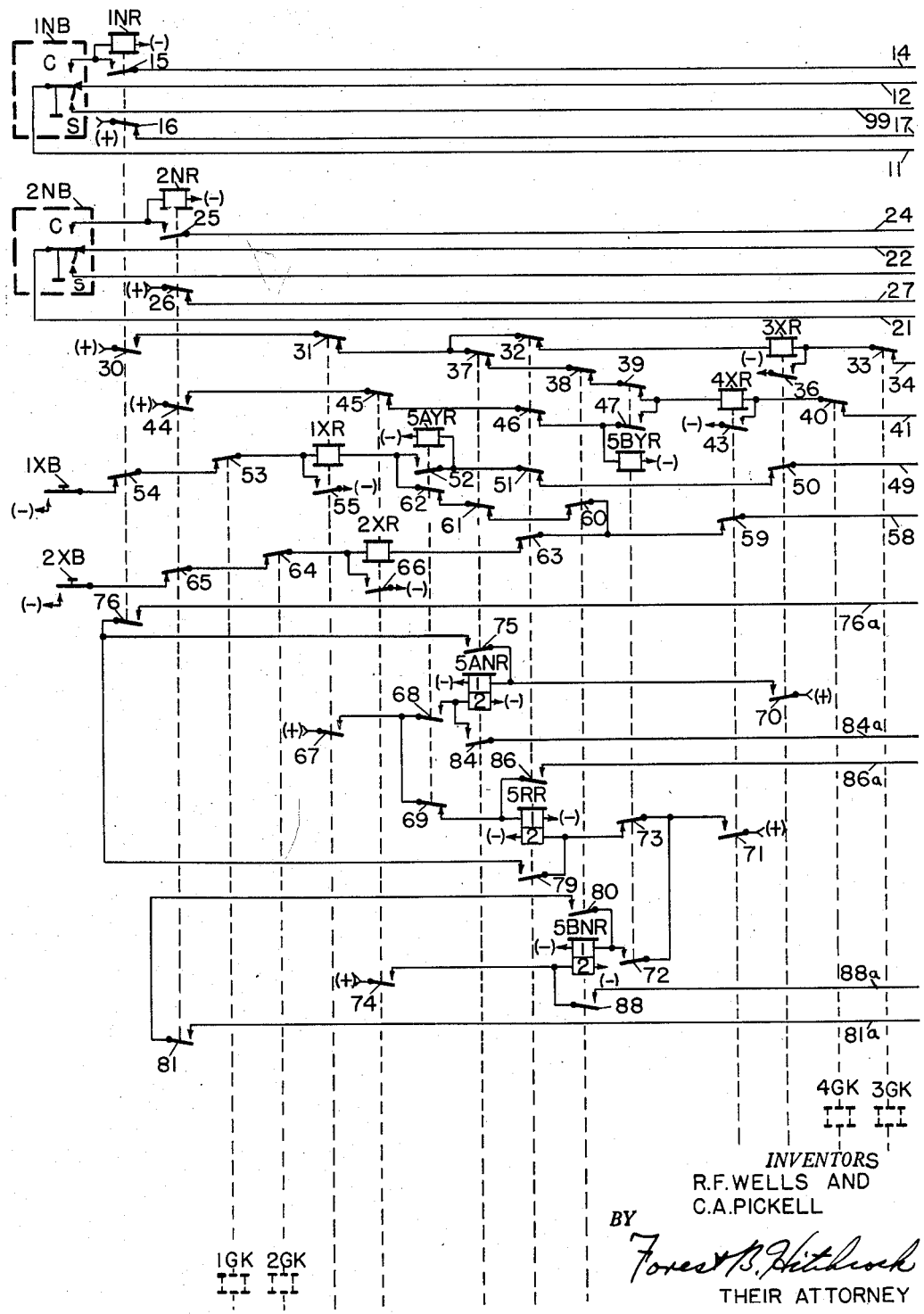
Figure 3B:
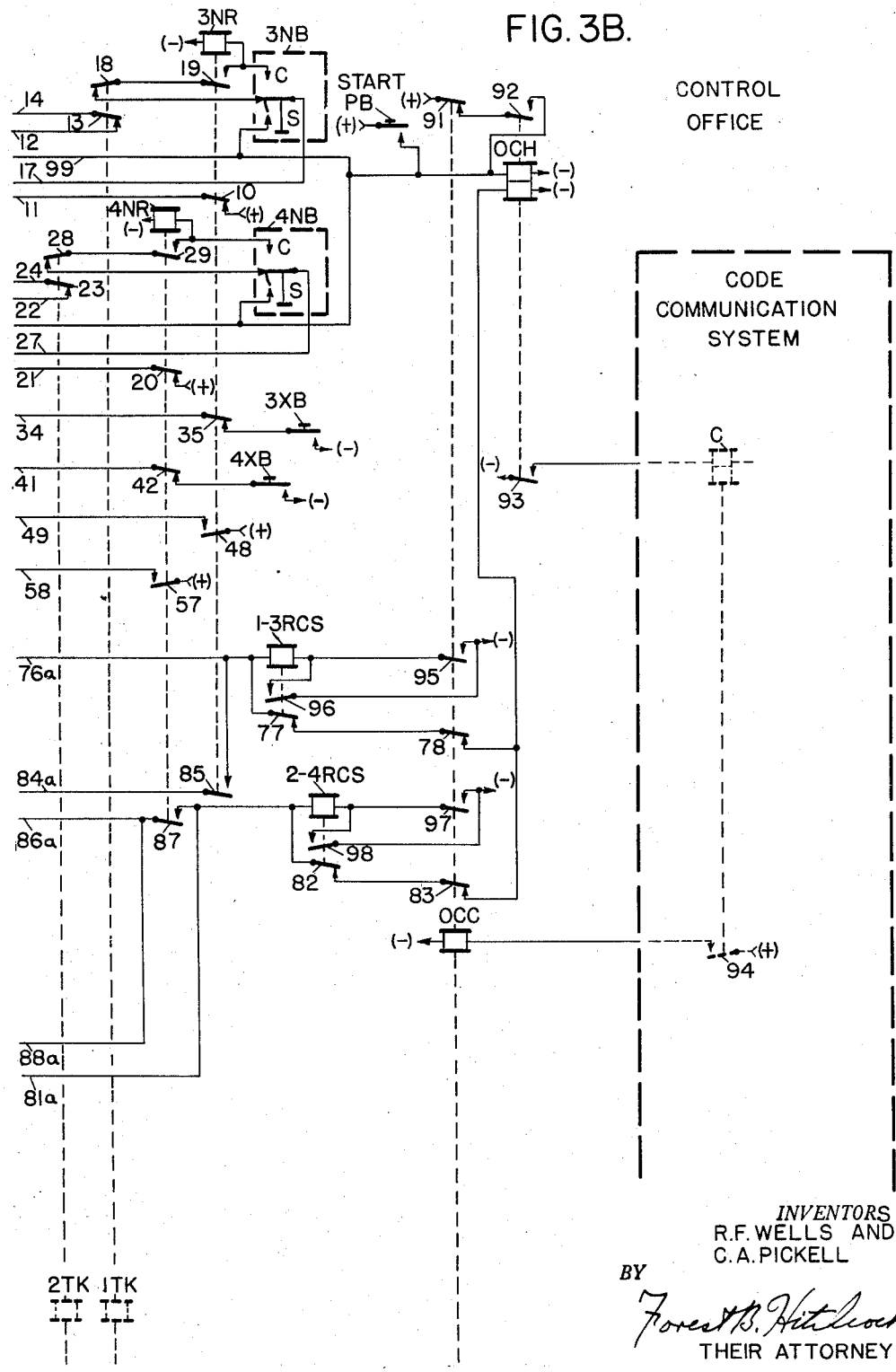

Entrance buttons 1NB, 2NB, 3NB and 4NB (see Figs. 1B, 3A and 3B) are assumed to be of the spring-biased push-pull type. In other words, the entrance buttons are spring-biased to maintain a neutral position from which they can be either pushed or pulled. It is assumed that the entrance buttons are pushed to call for a route and pulled to cancel an established route. The entrance buttons are represented in the circuit diagrams as movable contacts which can move from a normal center position to positions C or S; the reference characters C and S designate clear and stop controls for the entrance signal associated with a particular entrance button. It is assumed that when an entrance button is pushed contact is made in the C position and is maintained in the center position.

Exit buttons 1XB, 2XB, 3XB and 4XB are assumed to be two-position pushbuttons which are spring-biased to normally assume one position. The exit buttons are pushed to designate route exit points after corresponding entrance points are designated by the operation of entrance buttons. In the circuit diagrams the exit buttons are represented as normally open pushbutton contacts.

Figure 3C:
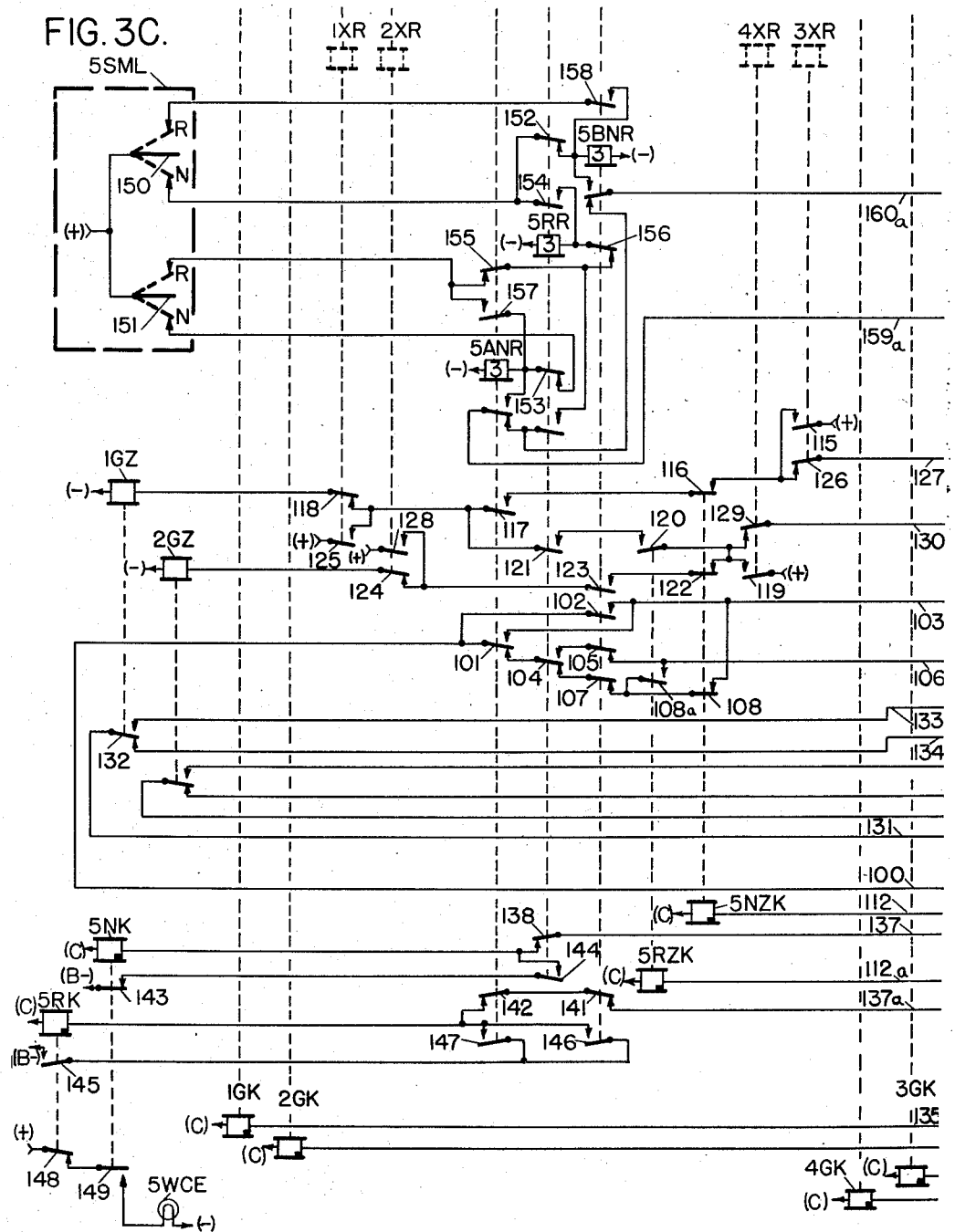

A control lever 5SML is provided for manual or test operation of the switch machines 5A and 5B. The lever 5SML is assumed to be a three-position key switch having a non-operative center position and two control positions. In the circuit diagram (see Fig. 3C) the lever 5SML is represented by two three-position movable contacts, each of which can close with fixed contacts N or R; the reference characters N and R refer to normal and reverse switch machine controls, respectively.

A start pushbutton is provided to cause the code communication system to operate at times other than those when the system is actuated by route initiation or route cancellation operations.

Although it is assumed that a number of indication lights are provided in practice, the only indication light to be descrbed in this invention is 5WCE whch is assumed to be lighted whenever switch machines 5A and 5B lie in positions which are out of correspondence with a particular route call.

Various relays are provided to indicate field conditions in response to operations of the code communication system. Track occupancies are indicated by relays 1TK and 2TK, signal aspects by relays 1GK, 2GK, 3GK and 4GK, switch positions by relays 5NK and 5RK, and route locking by relays 1LK and 2LK. Switch call indication relays 5NZK and 5RZK are provided to indicate the condition of the field apparatus for controlling switch machines 5A and 5B. In other words, relays 5NZK and 5RZK indicate the response of the field switch control apparatus to route calls. Relays 1TK, 2TK, 1LK, 2LK, 1GK, 2GK, 3GK, 4GK, 5NK, 5RK, 5NZK and 5RZK are asumed to be of the two-position magnetic stick, or polar stick, type in which the relay armature remains in the last operated position; and armature position is dependent upon the polarity of the energy applied to the relay.

Entrance relays 1NR, 2NR, 3NR and 4NR are provided to repeat route call operations of the entrance buttons 1NB, 2NB, 3NB and 4NB, respectively. The pushing of an entrance button results in the energization of the associated entrance relay which remains energized until the route call is cancelled either manually or automatically by track occupancy.

Exit relays 1XR, 2XR, 3XR and 4XR are associated with the exit buttons 1XB, 2XB, 3XB and 4XB, respectively. A particular exit relay can be energized through the actuation of its associated exit button only when an appropriate entrance relay is energized and no conflicting routes are already established. In other words, entrance points must be designated before exit points are selected; and furthermore, the establishment of conflicting routes for a plurality of trains must be prevented. Once energized, an exit relay is held energized until manual or automatic route cancellation is effected.

Route relays 5ANR, 5BNR and 5RR are provided to establish route controls in response to operations of the various entrance and exit buttons. Each route relay is normally deenergized and has three windings, two of which are responsive to route controls while the third is responsive to operations of the switch control lever 5SML. When energized, relays 5ANR and 5BNR call for normal positioning of switch machines 5A and 5B; and the energization of relay 5RR calls for the reverse positioning of switch machines 5A and 5B. Contacts of the route relays are included in control office circuit networks for the establishment of route and signal controls.

Selection of route relays is achieved through the operation of route selection relays 5AYR and 5BYR. The relays 5AYR and 5BYR determine which route relays are to be energized in accordance with particular routes selected by operations of the entrance and exit buttons.

Signal control relays 1GZ, 2GZ, 3GZ and 4GZ are provided to establish signal controls once particular routes are established. In other words, when a particular route is called for, the signal control relay for the signal governing that route cannot be energized until the field apparatus receives and responds to route controls. In the present invention, the switch control indication relays 5NZK and 5RZK indicate the response of field switch control relays.

A change relay OCH is provided to actuate the code communication system. Relay OCH is energized in response to circuit operations caused either by manipulations of the entrance and exit buttons or in response to actuations of the start pushbutton. Once energized, relay OCH is held energized, unil the code communication system begins operation.

Route call relays 1-3RCS and 2-4RCS are provided to prevent repeated operations of relay OCH by the same route control. Whenever a route is selected, resulting in the operation of relay OCH and the code communication system, a particular route call relay is energized and held energized until the route is cancelled. Back contacts of the route call relays in the pick-up circuit for relay OCH allow that relay to be energized only once by a particular route call.

A control cycle relay OCC is provided to differentiate between control and indication cycles performed by the code communication system. Relay OCC is energized only when a control cycle is in progress.

*Field apparatus*

A switch control relay 5WZ (see Fig. 4) is provided to control the switch machines 5A and 5B. Signal control relays 1GZP, 2GZP, 3GZP and 4GZP are provided to control signals 1, 2, 3 and 4, respectively. It is assumed that the switch and signal control relays are of the polar stick type and are energized by a stepping relay network. Contacts of the switch and signal control relays are assumed to be used in control circuits (not shown) for operating the switch machines and signals in response to control codes from the control office.

A control cycle relay FCC is provided to differentiate between control and indication cycle operations by the code communication system. Relay FCC is assumed to be energized only during control cycles.

Red repeater relays 1RP, 2RP, 3RP and 4RP are provided to indicate the conditions of the signals 1, 2, 3 and 4, respectively. It is assumed that each red repeater relay is energized whenever its respective signal displays a stop aspect.

Two track relays 1TR and 2TR are provided. The complete track circuits including the windings of the track relays are not shown, but are assumed to be of any well-known shunt type. In other words, relays 1TR and 2TR are normally energized, being critically deenergized whenever track sections 1T and 2T, respectively, are occupied by trains.

Lock relays 1LR and 2LR are provided to indicate route locking conditions. Each lock relay is energized under normal conditions wherein no routes are established to cause the clearing of a signal. Relay 1LR is deenergized whenever a route involving track 1T is established; and relay 2LR is deenergized by the establishment of routes over track 2T.

Switch correspondence relays 5NWC and 5RWC are provided to indicate normal and reverse switch correspondence, respectively. Both relays are assumed to be of the polar biased type. Relay 5NWC is energized whenever a normal switch call is made and the switch machines 5A and 5B (shown in Fig. 4 as a single machine 5SM) operate to their normal positions. Similarly, reverse switch calls and operations are detected by relay 5RWC. The operated positions of the switch machines 5A and 5B are indicated by the point detector contacts shown for one switch machine in Fig. 4. Operations of such point detectors are well-known in railway signaling practice.

*Code communication system*

As previously stated, the present invention can be used in conjunction with any suitable code communication system. In order to describe the present invention specifically, it has been assumed that a code communication system such as that described in Judge Patent No. 2,138,863, dated December 6, 1938, is used. This code communication system of the Judge patent is shown in Figs. 5A and 5B in a simple form. It has been simplified for the purposes of this disclosure wherein communication is established between a central office and a single field station.

A subsequent description reviews the elements of the Judge system used in the present disclosure and points out modifications made in adapting the system for use.

For simplicity in the present scheme separate line circuits are used for the transmission of control codes and indication codes; whereas the system disclosed in the Judge patent utilizes a three wire system in which one wire is common to both the control and the indication line circuits. Furthermore, the present scheme includes only one field location in lieu of the multiple station system disclosed in the Judge patent.

The transmission of control codes is accomplished by polarizing the control lines to form energy pulses of particular polarities. Indication codes are formed by energizations or deenergizations of the indication lines.

At the control office an impulsing relay E and a repeater relay EP are provided for alternately opening and closing the control line at spaced intervals. The impulsing relay E is actuated in response to operations of a bank of stepping relays 1V, 2V and 3V and to operations of a half-step relay VP. Although only three stepping relays are shown in the circuit diagrams, the present system is assumed to have ten stepping relays for providing control cycles of ten step capacities. The extension of a stepping relay bank to include a greater number of relays is disclosed in the Judge patent.

A line relay F is provided to respond to polarized energizations of the control line. The line relay F is assumed to be of the three-position biased-to-neutral polarized type. A repeated relay FP repeats each energization and each deenergization of the line relay F, irrespective of the polarity of the line energy which energizes the relay F. Relay FP is repeated by a repeater relay 2FP.

A slow acting relay SA is operated in response to operations of the line repeater relay 2FP. Once energized, relay SA is capable of retaining its armature during periods when relay 2FP is deenergized. Thus, relay SA remains picked-up during the transmission of code cycles. A second slow acting relay 2SA repeats the relay SA.

A control cycle starting relay C is provided to initiate the transmission of control cycles. The relay C is energized in response to energizations of the change relay OCH and remains energized throughout each control cycle. A similar relay FC is provided to initiate operations of the code communication apparatus at the control office whenever indication code cycles are transmitted from the field location. Relay FC is initially energized in response to energizations of a message receiving relay ME which responds to indication codes. Energization of relay FC is maintained throughout each indication cycle.

The message receiving relay ME replaces the relays MEB and MEF described in the Judge patent. A single message receiving relay can be used because the indication line circuit is separate from the control line circuit. In other words, the character of the control codes being transmitted at a given time have no effect on the indication line circuits in the present scheme.

The polarities of control codes are determined by the energization of either a relay PC or a relay NC. These relays replace the three position biased-to-neutral polar relay D described in the Judge patent supra. The above relay substitution is made for simplicity, avoiding the showing of polarized control circuits for the relay D. The relays PC and NC are selectively energized on each step of a control cycle in a predetermined code selection scheme represented by the code chart of Fig. 2. The polarity of the control line circuit on a particular step depends on which relay, PC or NC, is energized.

At the field location a line relay F, similar in type and function to the control office line relay F, is provided to respond to control codes. A repeater relay FP repeats energizations and deenergizations of the line relay F, irrespective of the polarity of the energy with which the relay F is energized.

A slow acting relay SA is provided to operate in response to operations of the line repeater relay FP. Once energized, the relay SA is capable of retaining its armature throughout code cycles by bridging the periods during which the relay FP is deenergized.

A bank of stepping relays 1V, 2V and 3V along with a half-step relay VP are provided. Once again it is assumed that the present system is extended to include ten stepping relays, even though only three are shown.

A checking relay CK is provided to differentiate between control cycles and indication cycles. The relay CK is of the polar stick type which retains its armature in the last operated position. The position assumed by the armature of relay CK is determined by the first operation of the polar line relay F during a code cycle.

A change relay CH is provided to cause the transmission of indication code cycles whenever a change in the condition of field signaling apparatus occurs.

Indication codes are formed by the selective operations of a pulsing relay PL which either energizes or deenergizes the indication line circuit on each step of a code cycle. The pulsing relay PL is selectively energized or deenergized in accordance with the conditions of field signaling apparatus and with a predetermined code selection scheme shown in the code chart of Fig. 2.

Relying on the Judge patent cited above for a complete description of operation, it can be said that during a control cycle the control step terminals 1–10 at the control office are energized in succession by the action of the stepping relays 1V–10V (only 1V–3V shown). Energy is taken from the control step terminals 1–10, through the control office control circuits to be described, to energize either relay PC or NC which, in turn, polarize the control line circuit on each step. The polarity of the control codes is detected by the line relay F at the field location. The stepping relays 1V–10V at the field location operate in synchronism with the control office stepping relays, resulting in the successive energizations of the field control step terminals 1–10 with energies polarized by the code detecting action of the field line relay F. Energy is taken from the field step terminals 1–10 to operate control relays at the field location which ultimately control signaling devices.

While the transmission of control codes is in progress an indication code cycle progresses concurrently. At the field location the indication step terminals 1–10 are either energized or deenergized by a circuit network to be described which reflects the condition of the field signaling apparatus. The indication step terminals 1–10 are scanned in sequence by a network of stepping relay contacts, resulting in the energization or deenergization of pulsing relay PL on each step. At the control office relay ME responds to the openings and/or closings of the indication line circuit by the pulsing relay PL. Relay ME then polarizes a stepping relay contact network which applies energy to the control office indication step terminals 1–10. Energy is then taken from the indication step terminals to operate control office indication relays in a manner to be described.

Thus, control code cycles and indication code cycles are transmitted simultaneously and in synchronism.

The operation of the present system can be described with reference to Figs. 3A–3D and 4 in which the essential portions of the code communication system described above are shown.

*Description of operation*

Control codes and indication codes are assumed to be transmitted in the sequence shown in the code chart (see Fig. 2). Under duplex conditions of operation (control cycles) control code and indication code transmissions are effected simultaneously; whereas indication cycles can be transmitted under simplex operating conditions.

In keeping with normal railway signaling practices route controls call for control of track switches first, later calling for the clearing of signals. Operations of switch machines 5A and 5B are called for on the first step of a control cycle, followed by signal controls on steps 5–8. Control code characters are represented by PC and NC which indicate which of the code determining relays PC or NC is energized for particular controls.

The indication sequence is identical under simplex or duplex operation with the exception that under simplex operation (i.e. during a pure indication cycle) the switch position indications on steps 3 and 4 represent actual switch positions while the indications on those steps under duplex operations represent the position of the switch control relay 5WZ. Indication code characteristics are represented by M (mark) and S (space) which respectively indicate energized and deenergized conditions of the indication lines.

It is evident that under duplex conditions that the transmission of switch controls at the start of a control cycle followed by indications of switch positions (control relay 5WZ) on subsequent steps permits the transmission of signal controls on later steps in the same cycle.

Route initiations are accomplished through manipulations of the entrance buttons 1NB, 2NB, 3NB and 4NB (see Fig. 1B). To initiate a route having an entrance point at signal 1, for example, entrance button 1NB is pushed to the clear C position (see Figs. 3A and 3B). Entrance relay 1NR is then energized by a pick-up circuit extending from (+), including back contact 10 of relay 3NR, wire 11, contact C of entrance button 1NB, and relay winding 1NR, to (—). Since the pushing and releasing of an entrance button does not open contact through the center position, relay 1NR is held energized through a stick circuit including back contact 10 of relay 3NR, wire 11, the center contact of entrance button 1NB, wire 12, back contact 13 of relay 1TK, wire 14, and front contact 15 of relay 1NR. It is evident that the pick-up circuit for relay 1NR is dependent on the position of the entrance button 1NB and the condition of the entrance relay 3NR for the opposing signal 3. Once energized, relay 1NR is held energized until its stick circuit is broken by either the opening of back contact 13 of relay 1TK or the opening of entrance button 1NB; the former case indicates track occupancy while the latter case indicates deliberate cancellation of the route by the operator.

The designation of a route having an entrance point at signal 3 is accomplished through the manipulation of entrance button 3NB. The pushing of entrance button 3NB results in the energization of relay 3NR by a pick-up circuit extending from (+), including back contact 16 of relay 1NR, wire 17, contact C of entrance button 3NB, and the relay winding of 3NR, to (—). A stick circuit for relay 3NR is established including back contact 16 of relay 1NR, wire 17, the center contact of entrance button 3NB, back contact 18 of relay 1TK and front contact 19 of relay 3NR. The pick-up and stick circuits for entrance relay 3NR are similar to those described for entrance relay 1NR. Since relays 1NR and 3NR control directly opposing signals, it is evident that a cross check between the relays is essential. Furthermore, occupancy of track section 1T causes the deenergization of either relay since entrance into this track section is governed by either signal 1 or signal 3.

Routes having entrance points at signals 2 and 4 are controlled by entrance buttons 2NB and 4NB, respectively. Entrance relay 2NR is energized whenever entrance button 2NB is pushed; and the pick-up circuit includes back contact 20 of relay 4NR, wire 21, contact C of entrance button 2NB, and the winding of relay 2NR. A stick circuit for relay 2NR includes back contact 20 of relay 4NR, wire 21, the center contact of entrance button 2NR, wire 22, back contact 23 of relay 2TK, wire 24, and front contact 25 of relay 2NR. In a similar manner, entrance relay 4NR is energized by a pick-up circuit including back contact 26 of relay 2NR, wire 27, contact C of entrance button 4NB, and the relay winding 4NR; and a stick circuit for relay 4NR is made including back contact 26 of relay 2NR, wire 27, the center contact of entrance button 4NB, back contact 28 of relay 2TK, and front contact 29 of relay 4NR. As previously described for the interrelation of entrance relays 1NR and 3NR, entrance relays 2NR and 4NR are cross checked since they govern directly opposing signals. Furthermore, occupancies of track section 2T result in the deenergization of either relay 2NR or 4NR by the opening of back contact 23 or 28, respectively, of relay 2TK.

It is evident from the preceding description that the designation of a route entrance point by the actuation of an entrance button results in the energization and sticking of an entrance relay. Once an entrance point is designated, an exit point may be designated through the actuation of an exit button.

If a route is established having an entrance point at signal 1 and an exit point at signal 3, entrance button 1NB is first actuated followed by an actuation of exit button 3XB. Relay 1NR is energized in response to the operation of entrance button 1NB and closes its front contact 30. A pick-up circuit for exit relay 3XR is then established; and this pick-up circuit includes front contact 30 of relay 1NR, back contact 31 of relay 1XR, back contact 32 of relay 5RR, relay winding 3XR, back contact 33 of relay 3GK, wire 34, back contact 35 of relay 3NR and exit push-button 3XB. It can be seen that the energization of exit relay 3XR is dependent upon the condition of the opposing exit relay 1XR as indicated by back contact 31 of relay 1XR. Furthermore, the energization of relay 3XR is dependent upon the deenergized state of the route relay 5RR, the signal indication relay 3GK and the entrance relay 3NR. In other words, exit relay 3XR cannot be energized if a conflicting route is initiated or established. Once energized, relay 3XR is held energized by the closing of its front contact 36 to form a stick circuit. Relay 3XR is then dependent only upon the closed condition of front contact 30 of relay 1NR for its continued energization. In other words, a route cancellation or the entrance of a train into the track section 1T causes the successive deenergization of relays 1NR and 3XR.

Assuming a route entrance point at signal 1 and an exit point at signal 4, manipulations of entrance button 1NB and exit button 4XB result in the energization of exit relay 4XR by a pickup circuit extending from (+), including front contact 30 of relay 1NR, back contact 31 of relay 1XR, back contact 37 of relay 5ANR, back contact 38 of relay 5BNR, back contact 39 of relay 5BYR, relay winding 4XR, back contact 40 of relay 4GK, wire 41, back contact 42 of relay 4NR and the exit pushbutton 4XB, to (—). Front contact 43 of relay 4XR then closes establishing a stick circuit for relay 4XR which is dependent only upon the closed condition of front contact 30 of relay 1NR.

Similar circuit operation can be described for a route having an entrance point at signal 2 and an exit point at signal 4. In this case, relay 4XR is energized by a pick-up circuit including front contact 44 of relay 2NR, back contact 45 of relay 2XR, back contact 46 of relay 5RR, front contact 47 of relay 5BYR, relay winding 4XR, back contact 40 of relay 4GK, wire 41, back contact 42 of relay 4NR and exit button 4XB. The closing of front contact 43 of relay 4XR establishes a stick circuit for that relay which is dependent only upon the closed condition of front contact 44 of relay 2NR. It must be noted that relay 5BYR is energized in advance of the energization of 4XR by the pick-up circuit including front contact 44 of relay 2NR, back contact 45 of relay 2XR, and back contact 46 of relay 5RR.

Assume further that a route is established having an entrance point at signal 3 and an exit point at signal 1. In this instance, relay 1XR is energized by a pick-up circuit including front contact 48 of relay 3NR, wire 49, back contact 50 of relay 3XR, back contact 51 of relay 5RR, front contact 52 of relay 5AYR which closes upon the energization of winding 5AYR at this point, relay winding 1XR, back contact 53 of relay 1GK, back contact 54 of relay 1NR, and exit button 1XB. A stick circuit is established for relay 1XR by the closing of its front contact 55.

Similarly, the remaining routes through the interlocking which have entrance points at signal 4 and exit points at signals 1 or 2 can be described as follows. For an exit designation at signal 1, relay 1XR is energized by a pick-up circuit extending from (+), including front contact 57 of relay 4NR, wire 58, back contact 59 of relay 4XR, back contact 60 of relay 5BNR, back contact 61 of relay 5ANR, back contact 62 of relay 5AYR, relay winding 1XR, back contact 53 of relay 1GK, back contact 54 of relay 1NR, and exit button 1XB, to (—); the stick circuit including front contact 55 of relay 1XR closes as before. With an exit designation at signal 2, relay 2XR is energized by a pick-up circuit including front contact 57 of relay 4NR, wire 58, back contact 59 of relay 4XR, back contact 63 of relay 5RR, relay winding 2XR, back contact 64 of relay 2GK, back contact 65 of relay 2NR, and exit button 2XB; and a stick circuit for relay 2XR is established by the closing of its front contact 66.

In the preceding description of route initiation, it is evident that measures are taken to prevent the establishment of conflicting routes under any conditions. Checks are made with regard to the condition of the track sections 1T and 2T, the condition of the signals 1—4 and the condition of the various office route control relays.

Once a route is established insofar as the route initiation network is concerned, the route completion network must be actuated to establish an actual route call. Whenever an exit relay is energized in the manner previously described, the route relays 5ANR, 5BNR and 5RR are energized in accordance with the nature of routes selected by the various entrance and exit relays.

The route relays 5ANR, 5BNR and 5RR are energized in accordance with the routes selected. The selection of particular route relays is dependent upon the energization of the various exit relays and route selection relays 5AYR and 5BYR. Relays 5ANR and 5BNR call for the normal position of the track switches 5A and 5B while relay 5RR calls for the reverse positions of both switches.

If an exit point is established at signal 1, relay 1XR is energized in a manner previously described. It is evident that an entrance point can be established at either signal 3 or signal 4. If the entrance point is at signal 3, relay 5AYR is energized in the initiation circuits. Under this condition, relay 5ANR is energized by a pick-up circuit including front contacts 67 and 68 of relays 1XR and 5AYR, respectively. If, on the other hand, the entrance point is at signal 4, relay 5AYR is not energized. Therefore, relay 5RR is energized by a pick-up circuit including front contact 67 of relay 1XR and back contact 69 of relay 5AYR.

Assume now that signal 3 is chosen as an exit point. Under this condition, signal 1 is the only possible entrance point and route requirements call for a normal positioning of track switch 5A. Relay 5ANR is energized by a pick-up circuit including its winding 1 and front contact 70 of relay 3XR. It is evident that relay 5ANR, along with relays 5BNR and 5RR, has two independent windings for the purpose of electrically isolating the various pick-up circuits.

Signal 4 can serve as an exit point for routes having entrance points at either signal 1 or signal 2. If the entrance point is at signal 2, relay 5BYR is energized in the initiation network resulting in the energization of winding 1 of relay 5BNR by a pick-up circuit including front contacts 71 and 72 of relays 4XR and 5BYR, respectively. If, however, the entrance point is at signal 1, relay 5BYR is not energized and relay 5RR is energized by a pick-up circuit including its winding 2, back contact 73 of relay 5BYR and front contact 71 of relay 4XR. Normal and reverse switch calls, respectively, are effected for the two possible routes.

The remaining route to be described has an exit point at signal 2 and an entrance point at signal 4. Under this condition, relay 5BNR is energized by a pick-up circuit including its winding 2 and front contact 74 of relay 2XR, a normal call being effected on the track switch 5B.

The selection of the various route relays for particular route designations results in the opening of their various back contacts in the initiation network previously described. In this manner, the initiation of conflicting routes is precluded in that opposing exit relays cannot be energized.

Once a route is established in the initiation and completion networks, it is necessary to actuate the control code communication system to transmit the route call information to the control apparatus at the field location. Relay OCH is provided to actuate the communication system and is energized in one of the manners to be described.

Under the route conditions wherein signal 1 is the entrance point, relay OCH can be energized by one pick-up circuit including front contact 70 of relay 3XR, front contact 75 of relay 5ANR, front contact 76 of relay 1NR, wire 76a, back contact 77 of relay 1–3RCS, and back contact 78 of relay OCC. Similarly, if the exit point is at signal 4 relay OCH is energized by a pick-up circuit including front contact 71 of relay 4XR, back contact 73 of relay 5BYR, front contact 79 of relay 5RR, front contact 76 of relay 1NR, wire 76a, and back contacts 77 and 78 of relays 1–3RCS and OCC, respectively.

When the entrance to a route is at signal 2, and the exit point at signal 4, relay OCH is energized by a pick-up circuit including front contact 71 of relay 4XR, front contact 72 of relay 5BYR, front contact 80 of relay 5BNR, front contact 81 of relay 2NR, wire 81a, back contacts 82 and 83 of relays 2–4RCS and OCC, respectively.

Relay OCH is energized when the route from signal 3 to signal 1 is called for by a pick-up circuit including front contact 67 of relay 1XR, front contact 68 of relay 5AYR, front contact 84 of relay 5ANR, wire 84a, front contact 85 of relay 3NR, and back contacts 77 and 78 of relays 1–3RCS and OCC, respectively.

When signal 4 is chosen as a route entrance point for routes having exit points at either signal 1 or signal 2, two pick-up circuits for relay OCH are possible. When signal 1 is the exit point, relay OCH is energized by a pick-up circuit including front contact 67 of relay 1XR, back contact 69 of relay 5AYR, front contact 86 of relay 5RR, wire 86a, front contact 87 of relay 4NR, and back contacts 82 and 83 of relays 2–4RCS and OCC, respectively. The choice of signal 2 as an exit point results in the energization of relay OCH by a pick-up circuit including front contact 74 of relay 2XR, front contact 88 of relay 5BNR, wire 88a, front contact 87 of relay 4NR, and back contacts 82 and 83 of relays 2–4RCS and OCC, respectively.

It is evident from the above description that the start relay OCH is energized whenever an entrance relay and an appropriate exit relay are energized; a check being made on the state of the cooperating route relays.

When relay OCH is energized, it is held energized by its pick-up circuit and a stick circuit including back contact 91 of relay OCC and front contact 92 of relay OCH. The stick circuit is actually provided for maintaining energization of relay OCH when the relay is picked-up by means of the start pushbutton; and further description of the start pushbutton operation is to be made later. The closing of front contact 93 or relay OCH results in the energization of relay C which causes the start of a control code cycle by the code communication system. Front contact 94 of relay C closes resulting in the energization of relay OCC. The opening of back contacts 78, 83 and 91 of relay OCC results in the deenergization of relay OCH. At the same time, the closing of front contacts 95 and 97 of relay OCC results in the energization of either relay 1–3RCS or 2–4RCS. It is evident that the windings of relays 1–3RCS and 2–4RCS are in parallel with the previously described pick-up circuits for relay OCH; therefore, further description of the pick-up circuits is unnecessary. Relay 1–3RCS is held energized by a stick circuit including its fronts contact 96 which is in parallel with front contact 95 of relay OCC. Similarly, stick contact 98 of relay 2–4RCS is in parallel with front contact 97 of relay OCC. Energization of either relay 1–3RCS or 2–4RCS is maintained as long as the entrance relay initially associated with the energization of either relay is energized. In other words, route cancellation must be effected before relay 1–3RCS or relay 2–4RCS can be deenergized. It is evident that the completion of a control cycle by the communication system ultimately results in the deenergization of the relay C and, consequently, the relay OCC. The circuit structure including relays 1–3RCS and 2–4RCS is such that repeated calls for one particular route are prevented. In other words, relay OCH cannot be reenergized by the closing of back contacts 78 or 83 of relay OCC because either back contact 77 of relay 1–3RCS or back contact 82 of relay 2–4RCS is open.

When the code communication system is actuated in response to the energization of relay OCH, the stepping relay network operates causing successive energizations of the various step terminals represented in Fig. 3D. On control step 1, energy is applied for the energization of a code determining relay PC or NC in accordance with the position of track switches 5A and 5B called for by the route network. If switch 5A, for example, is to be in its normal position for a particular route, relay 5ANR is energized and code determining relay PC is energized by a pick-up circuit extending from step 1 terminal and including wire 100, front contact 101 of relay 5ANR, wire 103, and the winding of relay PC. If reverse switch calls are required, relay NC is energized by a circuit extending from step 1 terminal, including wire 100, back contact 101 of relay 5ANR, front contact 104 of relay 5RR, back contact 105 of relay 5BNR, wire 106, and relay winding NC. If track switch 5B is to be called to its normal position, relay PC is energized by a pick-up circuit extending from step 1 terminal and including wire 100, front contact 102 of relay 5BNR, wire 103, and relay winding PC. If no route call is made but the code communication system is actuated by other means to be described, the route relays 5ANR, 5BNR and 5RR are deenergized. In this case, relay PC or relay NC is energized on control step 1 in accordance with the last actuated position of the track switches as indicated by front contact 108 of relay 5NZK or front contact 108a of relay 5RZK. Since relays 5NZK and 5RZK are of the magnetic stick type, their armatures are maintained in the last operated positions. The pick-up circuits for relays PC and NC which include front contact 108 of relay 5NZK or front contact 108a of relay 5RZK also include back contacts 101, 104 and 107 of relays 5ANR, 5RR and 5BNR, respectively.

Without specifically describing the operation of field apparatus at this time and in view of preceding descriptions of the operation of the code communication system, it can be said that the selective energization of either relay PC or NC on control step 1 results in the transmission of a control code character which selectively operates a switch control relay 5WZ at the field location. The operation of the relay 5WZ determines the characters of indication codes transmitted to the control office on indication steps 3 and 4; and the characters of these codes determine the polarities of indication step terminals 3 and 4 at the control office. The polarity of indication step 3 selectively operates the polar-stick relay 5NZK, the pick-up circuit for which includes indication step terminal 3, front contact 111 of relay OCC and wire 112. If the polarity of indication step terminal 3 is positive (B+) relay 5NZK is assumed to close its front contacts; a negative (B—) polarity on step 3 is assumed to cause relay 5NZK to close its back contacts. Relay 5NZK holds its armature in the last operated position when energy is removed from indication step terminal 3. Similarly, relay 5RZK is selectively energized when indication step terminal 4 is energized. The pick-up circuit for relay 5RZK includes indication step terminal 4, front contact 111a of relay OCC, wire 112a and the winding of relay 5RZK. When the polarity of indication step terminal is (B+) relay 5RZK is assumed to close its front contacts; (B—) polarity causes relay 5RZK to close its back contacts. The armature of relay 5RZK is held in the last operated position whenever the relay is deenergized.

It can be noted that the track switch indication codes received on indication steps 3 and 4 cause energy to be selectively applied to either relays 5NZK and 5RZK or to indication relays 5NK and 5RK by the action of relay OCC. In other words, relay OCC is energized only during control cycles (duplex operation) and during such cycles closes its front contacts 111 and 111a to energize relays 5NZK and 5RZK. During indication (simplex) cycles, however, relay OCC closes its back contacts 111 and 111a to operate either relay 5NK or 5RK in accordance with the polarities of indication step terminals 3 and 4. This operation is to be described later in greater detail.

To summarize, during a control cycle a switch control code character is transmitted to the field location on control step 1. Resultant switch indication code characters are received from the field location on indication steps 3 and 4; and the indication code characters reflect, in this case, the response of a switch control relay 5WZ in the field. At this time, the control office signal control network can be actuated to set up the proper control code character for the clearing of an entrance signal for a particular selected route.

Assuming that signal 1 is to be cleared for a route having an exit point at signal 3, relay 1GZ is energized by a pick-up circuit extending from (+), including front contact 115 of relay 3XR, front contact 116 of relay 5NZK, front contact 117 of relay 5ANR, back contact 118 of relay 1XR, and relay winding 1GZ, to (—). This particular route requires that track switch 5A be operated to its normal position. This condition is checked by front contacts 116 and 117 of relays 5NZK and 5ANR, respectively. In other words, the switch call as indicated by relay 5ANR is checked against the operated position of the field switch control relay 5WZ as indicated by relay 5NZK. If correspondence does not exist, it is obvious that relay 1GZ cannot be energized to call for the clearing of signal 1.

If signal 1 is to be cleared for a route having an exit point at signal 4, relay 1GZ is energized by a pick-up circuit extending from (+), including front contact 119 of relay 4XR, front contact 120 of relay 5RZK, front contact 121 of relay 5RR, back contact 118 of relay 1XR, and relay winding 1GZ, to (—). In this instance, a reverse switch call is checked against the response of the field switch control relay. The establishment of a route from signal 2 to signal 4 results in the energization of relay 2GZ by a pick-up circuit including front contact 119 of relay 4XR, front contact 122 of relay 5NZK, front contact 123 of relay 5BNR, and back contact 124 of relay 2XR. For this route, a normal switch call is checked against a normal response by the field switch control relay.

To clear signal 3 for a route having an exit point at signal 1, relay 3GZ is energized by a pick-up circuit extending from (+), including front contact 125 of relay 1XR, front contact 117 of relay 5ANR, front contact 116 of relay 5NZK, back contact 126 of relay 3XR, wire 127, and relay winding 3GZ, to (—). Normal switch call is checked against the response of the field switch control relay for this route.

Relay 4GZ is energized to clear signal 4 for a route having an exit point at signal 1 by a pick-up circuit including front contact 125 of relay 1XR, front contact 121 of relay 5RR, front contact 120 of relay 5RZK, back contact 129 of relay 4XR, and wire 130. A clearing of signal 4 for a route having an exit point at signal 2 results in the energization of relay 4GZ by a pick-up circuit including front contact 128 of relay 2XR, front contact 123 of relay 5BNR, front contact 122 of relay 5NZK, back contact 129 of relay 4XR, and wire 130.

The various GZ relays described above remain energized as long as the cooperating exit relay associated with each particular GZ relay is energized. This condition, in turn, is dependent upon the maintained energization of the various entrance relays which, once energized, remain energized until route cancellation is effected.

Signal controls are transmitted to the field in the form of control code characters set up by the code determining relays PC and NC on control steps 7, 8, 9, and 10. Controls for signal 1, for example, are determined on control step 7 by the energization of relay PC for a clear control or relay NC for a stop control. In the case of a clear control, relay PC is energized by a pick-up circuit extending from control step terminal 7, and including wire 131, front contact 132 of relay 1GZ, wire 133, and relay winding PC. Relay NC is energized for a stop control by a similar pick-up circuit which includes back contact 132 of relay 1GZ, and wire 134.

Similar circuit operations can be described for relays PC and NC on control steps 8, 9 and 10 in accordance with the positions of signal control relays 2GZ, 3GZ and 4GZ, respectively. It is evident from the preceding description that during a control cycle, a signal control is always sent. The character of the code is dependent upon whether or not the signal control relays can be energized. It can be further noted that signal control steps are separated from switch indication steps by a plurality of steps so that indications of track switch conditions can be received before the signal controls are transmitted. In other words, for switch and signal controls to be transmitted in the same control cycle, a time interval between controls must be provided to insure proper operation.

When signal controls are effective in the field, indications are received on indication steps 7, 8 9 and 10. In the case of signal 1, for example, a clear condition is indicated by the energization of relay 1GK by a circuit extending from indication step terminal 7, including wire 135 and relay winding 1GK, to (C). It is assumed under these conditions that the polarity of the energy applied to the indication step terminal 7 is (B+) for the indication of a clear signal; and the application of (B−) energy indicates a stop condition. In other words, the magnetic stick relay 1GK is either picked up or driven down depending upon the polarity of the indication energy. Similar conditions exist for the operation of relays 2GK, 3GK and 4GK. The energization of relay 1GK, for example, opens its back contact 53 in the pick-up circuit for relay 1XR previously described. Thus, when signal 1 is indicated as being cleared, an exit point cannot be established at signal 1.

During a control cycle the track switch position indicated to the control office is not an actual indication of switch position but is an indication of the response of the field switch control relay to particular route calls. When changes in field conditions occur, an indication cycle is initiated by means to be described which causes the energization of one of the switch indication relays 5NK and 5RK. A normal switch position is indicated on indication step 3 by a pick-up circuit extending from indication step terminal 3, including back contact 111 of relay OCC, wire 137, back contact 138 of relay 5RR, and relay winding 5NK, to (C). It is assumed that (B+) energy is applied to the pick-up circuit by the indication step terminal 3. It is further assumed that this polarity of energization causes relay 5NK to pick-up its armature.

A reverse switch indication is obtained by a similar energization of relay 5RK by a pick-up circuit extending from indication step terminal 4, including back contact 111a of relay OCC, wire 137a, back contact 141 of relay 5BNR, back contact 142 of relay 5ANR, and relay winding 5RK, to (C). The polarity of the indication step terminal 4 is assumed to be (B+).

Relays 5NK and 5RK are assumed to be of the magnetic stick type and retain their armatures in their last operated positions. When the last operated position of relay 5NK is to indicate a normal switch position, front contact 143 of relay 5NK is closed. If a reverse route call is made while this condition exists, front contact 144 of relay 5RK closes resulting in the driving down of the armature of relay 5NK by polarized energization through a circuit extending from (C), including relay winding 5NK, front contact 144 of relay 5RR, and front contact 143 of relay 5NK to (B−). A similar drive-down circuit for relay 5RK can be traced from (C), including relay winding 5RK, front contact 146 of relay 5BNR or front contact 147 of relay 5ANR, and front contact 145 of relay 5RK, to (B−). In this manner, a switch call which is different from the last operated position of the switch causes the relays 5NK and 5RK to both assume dropped away positions. Under these conditions, switch out-of-correspondence light 5WCE is energized by a circuit including back contacts 148 and 149 of relays 5RK and 5NK, respectively. The switch out-of-correspondence light 5WCE is lighted only when correspondence between switch call and switch position does not exist. It is evident that under normal conditions, either relay 5NK or 5RK will retain its armature in a picked-up position resulting in a dark condition of the light 5WCE.

If a route is once established by the control office apparatus, and the control information is transmitted to the field location resulting in the physical alignment of the field apparatus, it is possible to cancel the established route by pulling the appropriate entrance button used in establishing the particular route. Assume, for example, that a route is established having signal 1 as the entrance point and signal 3 as the exit point. The control office relay network is conditioned as previously described and is held in that condition by the energized state of entrance relay 1NR. Relay 1NR may be deenergized by opening its stick circuit at the entrance button 1NB. In other words, a pulling of entrance button 1NB opens its center contact and closes it stop contact S. The opening of the center contact deenergizes relay 1NR and therefore relays 3XR, 5ANR, 1–3RCS, and 1GZ. The closing of contact S of entrance button 1NB energizes the start relay OCH through a circuit including wire 99. Relay OCH actuates the control code communication system as previously described and a stop control code is sent to the field on step 7 of the control cycle because of the energization of relay NC by its previously described pick-up circuit including back contact 132 of relay 1GZ.

Similar route cancellations can be effected through the operation of entrance buttons 2NB, 3NB and 4NB.

Manual control of track switches 5A and 5B can be effected through the use of the control lever 5SML and the start push-button PB. Positioning of lever 5SML to the normal switch call position closes the contacts 150 and 151 in the N positions. Relay 5BNR is energized by a pick-up circuit extending from (+), including contact 150 of lever 5SML in the N position, back contact 152 of relay 5RR and winding 3 of relay 5BNR, to (−). Similarly, relay 5ANR is energized by a pick-up circuit including contact 151 of lever 5SML in the N position, back contact 153 of relay 5RR and winding 3 of relay 5ANR.

A reverse switch call results in the energization of relay 5RR by a pick-up circuit including contact 151 of lever 5SML in the R position, back contact 155 of relay 5ANR, back contact 156 of relay 5BNR, and winding 3 of relay 5RR.

If a manual switch control is attempted at a time when any of the route control relays 5ANR, 5RNR and 5RR are energized it is impossible to alter the switch call previously made. Assume, for example, that track switches 5A and 5B are called to their normal positions by a route control resulting from the energization of relays 5ANR and 5BNR. If the switch lever 5SML is then positioned to its reverse call position, the pick-up circuit or relay 5RR previously described is open at back contacts 155 and 156 of relays 5ANR and 5BNR, respectively. Front contacts 157 and 158 of relays 5ANR and 5BNR, respectively, are closed providing energizing circuits for the windings 3 of relays 5ANR and 5BNR. In other words, energy is applied to relays which are already in an energized state; and no effect is produced in switch control operations.

Back contacts 159 and 160 of lock indication relays 1LK and 2LK, respectively, provide stick circuits for the various route control relays whenever a route is established and the corresponding lock relays in the field are deenergized. Back contact 159 of relay 1LK in conjunction with wire 159a provides an obvious stick circuit for either relay 5ANR or 5RR. Similarly, back contact 160 of relay 2LK in conjunction with wire 160a provides a stick circuit for either relay 5BNR or 5RR.

Once the lever 5SML is positioned resulting in the energization of the appropriate route relays, a control cycle can be initiated through the energization of relay OCH by the use of the start pushbutton PB. A control cycle of this type results in switch positioning and the return of indications from the field but produces no effect on the condition of the various signals which are assumed to be in their stop positions.

If it is desired to check the indications received from the field location, a control and indication cycle (duplex) can be started by the actuation of the start pushbutton.

A brief description has been given with regard to the field apparatus and the indications transmitted to the control office from the field location. A more complete description of the field location will now be given.

In Fig. 4, the terminals of the stepping relay network for control code communication are shown. Switch control relay 5WZ is shown controlled on control step 1 while signal control relays 1GZP, 2GZP, 3GZP and 4GZP are shown controlled on control steps 7, 8, 9 and 10, respectively. It is assumed that the stepping relay contact network for controls is capable of applying energy of either polarity (B+) or (B—) to the above control relays which are assumed to be of the polar stick type. The actual control circuits for signaling devices, including contacts of the various control relays are not shown and are not essential in the description of the present invention.

Similarly, the terminals of the stepping relay network for indication code communication are shown. The indication step terminals are energized or deenergized by circuits including contacts of the particular field indication relays which determine the characters of indication codes to be transmitted on the various steps.

The switch position indication to be transmitted by the indication code communication system is determined by either the position of control relay 5WZ during control cycles (duplex) or by the positions of switch correspondence relays 5NWC and 5RWC during indication cycles (simplex). The switch correspondence relays 5NWC and 5RWC are energized by pick-up circuits which include contacts of the point detector mechanism in the track switch machines and contacts of control relays 5WZ. Relay 5NWC, for example, is energized only when the armature of relay 5WZ is up and the point detector contact blocks in the switch machine 5SM are in the position indicated by the solid lines. Relays 5NWC and 5RWC are assumed to be biased to respond only when current is in the direction of the arrows.

During a control cycle the characters of track switch position indication codes are determined by the energization or deenergization of the indication step terminals 3 and 4. The transmission of a switch-normal indication code results when front contact 165 of relay 5WZ is closed, applying energy through front contact 166 of relay FCC to indication step terminal 3. When back contact 165a of relay 5WZ is closed indication step terminal 4 is energized through front contact 166a of relay FCC resulting in the transmission of a switch-reverse indication code. During indication code cycles (simplex), however, back contacts 166 and 166a of relay FCC are closed rendering the energization or deenergization of indication step terminals 3 and 4 dependent upon the condition of front contacts 167 and 168 of relays 5RWC and 5NWC, respectively. The closure of front contact 168 of relay 5NWC applies energy to indication step terminal 3 to cause the transmission of a switch-normal indication code, while the closure of front contact 167 of relay 5RWC applies energy to indication step terminal 4 resulting in the transmission of a switch-reverse indication code.

The red repeater relays 1RP, 2RP, 3RP and 4RP are assumed to be energized whenever the searchlight signal mechanisms in signals 1, 2, 3 and 4, respectively, are in their stop positions. It is evident that when signal 1 displays a red aspect relay 1RP is energized. Thus, back contact 170 of relay 1RP is open deenergizing indication step terminal 7; a stop indication code is transmitted on step 7 to indicate the stop condition of signal 1. Deenergization of relay 1RP results in the application of energy to indication step terminal 7 by back contact 170 of relay 1RP. In this instance a signal-clear indication code is transmitted for signal 1 on indication step 7. Similar operations are produced by back contacts 171, 172 and 173 of relays 2RP, 3RP and 4RP, respectively, in selecting indication code characters for transmission on indication steps 8, 9 and 10, respectively.

It is further evident that locking indications are selected in a similar manner on indication steps 1 and 2 by front contact 174 of relay 1LR and front contact 175 of relay 2LR, respectively. Track occupancy indication codes are similarly selected on indication steps 5 and 6 by back contact 176 of relay 1TR and back contact 177 of relay 2TR, respectively.

An indication code cycle (simplex) is started when the change relay CH at the field location is deenergized by the opening of its stick circuit. In Fig. 4 the stick circuit for the field change relay CH includes a series connection of dependent front-back contacts 180—187 of relays 1RP, 2RP, 3RP, 4RP, 1TR, 2TR, 5NWC and 5RWC, respectively. A change in the state of any of these relays results in the momentary opening of the stick circuit for field change relay CH. For example, if track 1 becomes occupied relay 1TR is shunted and releases its armature. Front contact 184 of relay 1TR opens, followed by the closing of back contact 184 of relay 1TR. During the crossover time of the movable contact 184 the stick circuit for field change relay CH is open; and relay CH drops away opening its stick contact. The stick circuit is reclosed by back contact 184 of relay 1TR and becomes effective again when relay CH is again energized by its pick-up circuit shown in the code communication drawings (Fig. 5B).

It is evident from the preceding description of apparatus and circuit operation that greater speed of operation can be obtained in coded centralized traffic control systems whenever controls and indications are transmitted simultaneously and, furthermore, whenever indications of track switch positions can be made dependent upon the condition of the switch control relays rather than the actual track switch positions.

The system described above can be expanded for use in large interlockings involving more tracks, crossovers and signals. In such instances the same principles described above for a simple interlocking hold. In other words, all track switch controls for a route are transmitted and all switch indications are received early in a control cycle; and signal controls are sent during the last portion of the cycle.

The scheme disclosed in this invention is applicable to numerous types of coded systems. Carrier systems and various fast scanning systems can make use of the track switch check, or route check, principle disclosed.

Having described a route check scheme for a coded control system as one specific embodiment of the present invention, it is desired to be understood that this form is selected to facilitate in the disclosure of the invention rather than to limit the number of forms which is may assume; and, it is to be further understood that various

What we claim is:

1. In a centralized traffic control system for controlling and indicating the position of a track switch and a signal located at a field station remote from a control office, normally at rest code communication apparatus including respective control and indication communication channels connecting the control office and the field station operable through control and indication cycles of operation both concurrently and separately, code selecting means at the control office for selecting a switch control code and a signal control code for transmission successively during a single control cycle of operation, a two position track switch control relay at the field station subject to control over the code communication apparatus in response to said switch control code for operating said track switch selectively to normal and reverse positions in accordance with the switch control code received, normal and reverse switch correspondence relays at the field station subject to energization to indicate correspondence between the actual position of said track switch and the position of said switch control relay, means at the field station selectively actuated in accordance with whether or not a control cycle is in progress for selecting the transmission of an indication as to the position of said switch control relay or as to the energized or deenergized condition of said switch correspondence relays, indication code receiving means at the control office selectively responsive to indication codes received from the field station, said indication code receiving means being conditioned differently in response to the same codes in accordance with whether or not a control cycle is currently in progress, and circuit means for transmitting a signal clearing code from the control office to the field station only provided that said indication code receiving means indicates that said switch control relay has been positioned at the field station in accordance with a switch control code transmitted during a prior step in the same control cycle.

2. In a centralized traffic control system for controlling and indicating the position of a track switch at a field station remote from a control office, normally at rest code communication apparatus including control and indication communication channels connecting the control office and the field station and operable through control and indication cycles of operation both concurrently and separately, a two position track switch control relay at the field station subject to control over the code communication apparatus from the control office for operating said track switch selectively to normal and reverse positions, normal and reverse switch correspondence relays at the field station subject to energization to indicate correspondence between the actual position of said track switch and the position called for by said switch control relay, means at the field station selectively actuated in accordance with whether or not a control cycle is in progress for selecting the transmission of an indication as to the position of said track switch control relay or an indication as to the picked up or dropped away condition of said correspondence relays in accordance with whether or not a control cycle is concurrently in progress, and code receiving means at the control office selectively operable to be differently conditioned in response to the same codes during an indication cycle in accordance with whether or not the indication cycle is transmitted concurrently with a control cycle.

3. In a centralized traffic control system for controlling and indicating the positions of various devices at a field station remote from a control office, normally at rest code communication apparatus including control and indication channels connecting the control office and the field station and operable through control and indication cycles of operation both concurrently and separately, two groups of multiple position devices at the field station subject to control over said code communication apparatus from the control office and having their positions indicated at the control office, two groups of indication storage devices at the control office, a selecting relay at the control office and at the field station, circuit means for energizing said selecting relays when and only when a control cycle of said code communication apparatus is in progress, circuit means at the field station for transmitting indications over said code communication apparatus of the positions of one of said groups of devices when said selecting relay at the field station is picked up and for transmitting indications of the position the other group of said devices during an indication cycle when said selecting relay at the field station is deenergized, and circuit means at the control office for selectively actuating only one of said groups of indication relays in response to the communication of indication codes from the field station when said selecting relay at the control office is energized and for selectively actuating only the other group of indication storage devices when said last named selecting relay is deenergized.

References Cited in the file of this patent

UNITED STATES PATENTS

| 2,090,912 | Hailes | Aug. 24, 1937 |
| 2,139,562 | Preston | Dec. 6, 1938 |
| 2,592,704 | Jerome et al. | Apr. 15, 1952 |
| 2,608,646 | Failor | Aug. 26, 1952 |
| 2,611,074 | Pascoe et al. | Sept. 16, 1952 |
| 2,651,711 | Johanek et al. | Sept. 8, 1953 |